United States Patent [19]

Reil

[11] Patent Number: 4,578,004

[45] Date of Patent: Mar. 25, 1986

[54] APPARATUS FOR PUNCHING A HOLE IN A PAPER WEB

[75] Inventor: Wilhelm Reil, Bensheim, Fed. Rep. of Germany

[73] Assignee: Tetra Pak Developpement S.A., Switzerland

[21] Appl. No.: 374,316

[22] Filed: May 3, 1982

[30] Foreign Application Priority Data

May 16, 1981 [DE] Fed. Rep. of Germany ....... 3119602

[51] Int. Cl.[4] ................ B23B 41/00

[52] U.S. Cl. ................ 408/87; 83/879; 408/95; 408/101; 408/241 S

[58] Field of Search ................ 408/85, 87, 95, 91, 408/116, 97, 204, 68, 98, 99, 100, 101, 241 S, 238, 67, 102; 409/231, 232, 234; 83/879, 880, 881, 582, 658

[56] References Cited

U.S. PATENT DOCUMENTS 2,527,968 9/1950 Sherman et al. ................ 408/67
2,849,902 9/1958 De Vlieg et al. ................ 408/116
3,066,554 12/1962 Hanson ................ 408/87
3,125,883 3/1964 Wollner ................ 408/204
4,060,333 11/1977 White ................ 408/204
4,244,669 1/1981 Puritz et al. ................ 407/53

FOREIGN PATENT DOCUMENTS 2333662 1/1975 Fed. Rep. of Germany ...... 408/116
537761 3/1977 U.S.S.R. ................ 408/87

*Primary Examiner*—Gil Weidenfeld
*Assistant Examiner*—Daniel W. Howell
*Attorney, Agent, or Firm*—Ratner & Prestia

[57] ABSTRACT

An apparatus for punching a hole in a paper web, in particular for the production of liquid packs, has a movable punch which can be pressed against a counter-plate and which has a circular blade at its tip. In accordance with the invention, to permit the desired hole to be punched into the packaging material to the desired depth, using simple means, the punch has a rotationally driven cutter head. Due to the rotary movement of the punch or the blade-forming edge at the tip of the punch, the blade is no longer merely pressed into the paper web, as in previously known punching apparatuses, but in accordance with the invention it is rotated perpendicularly to the pressing movement, giving a cutting effect as when using a knife.

11 Claims, 3 Drawing Figures

APPARATUS FOR PUNCHING A HOLE IN A PAPER WEB

Figure 1:
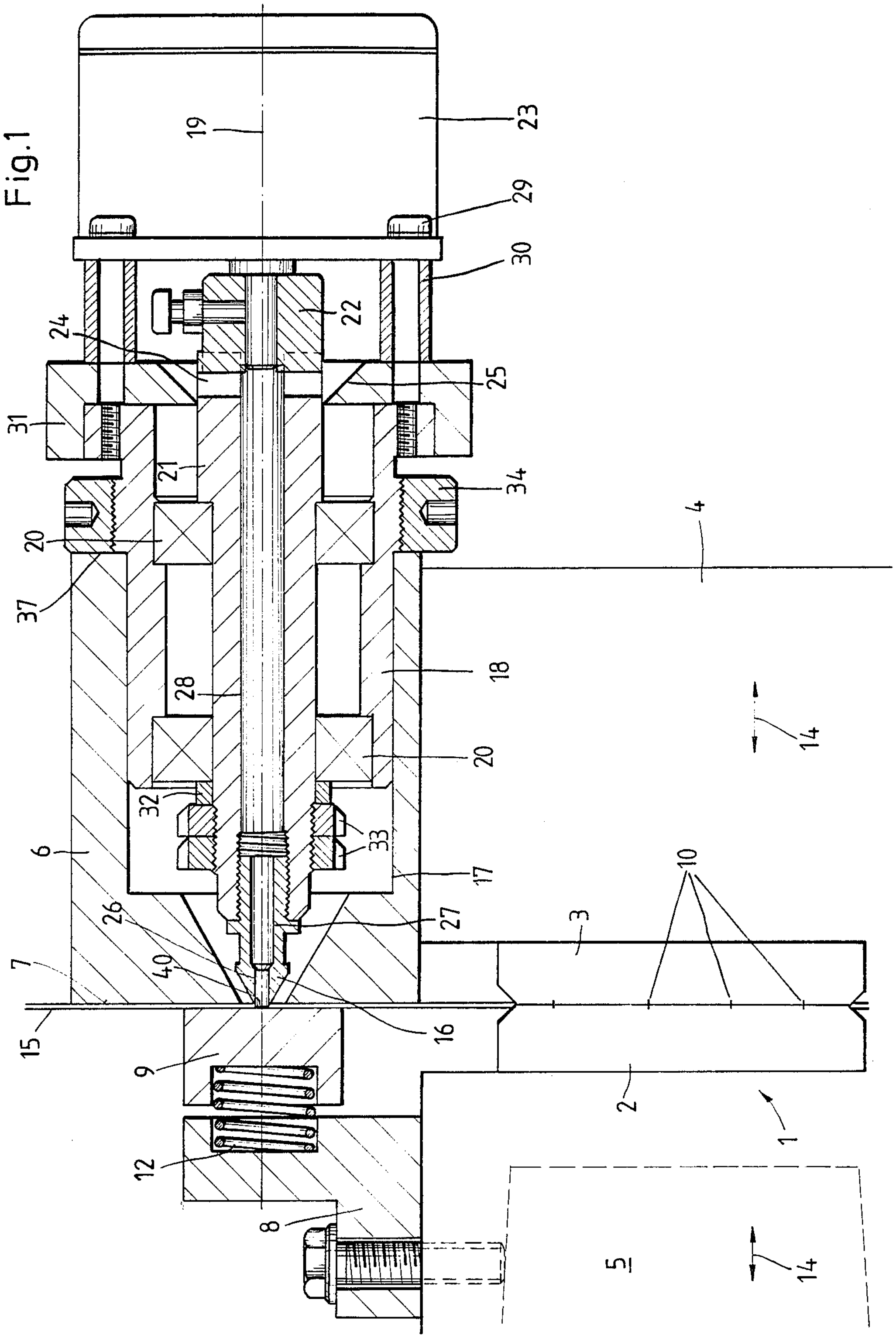

The invention relates to an apparatus for punching a hole in a paper web, in particular for the manufacture of liquid packs, comprising a movable punch which can be pressed against a counter-plate and which has a circular blade at its tip.

Various kinds of packs with punched holes are known, including in particular packs for liquid beverages comprising plastics-coated paper. The punched holes in the paper web of such packs are provided for inserting a straw. The aim of the manufacturer of such packs is to pre-punch the hole in the paper web in such a way that subsequently on the one hand the pack is or remains sealed while on the other hand the user of the pack can nonetheless easily open the pack by pushing the straw into the hole.

Various machines have been developed for producing such a punched hole. One known machine has two punching rolls which are rotatable about axes disposed parallel to each other, with the paper web, which at that time is still uncoated, being passed between the rolls in a condition of proper register. A projection disposed on the punching roll passes into the recess in the oppositely disposed counter-pressure roll, thereby punching through the web of paper. The paper web which is thus provided with the hole is then passed between a further pair of rolls, namely a pressure roll and a cooling roll, for coating the paper web with plastics material on both sides. In this punching process and the known machine therefore, the paper web has a hole punched completely through it, and the piece of paper or cardboard which is punched out, and which is also referred to as the central portion, is completely removed from the paper web. The resulting perforation through the paper web, which is therefore no longer liquid-tight, is made good again by the skin of plastics material which is applied to both surfaces of the paper web.

This is an expensive process and a costly machine. The manufacture of the heavy rolls is expensive, they must operate with a high degree of accuracy and in addition at high speeds, and there is a dependency on a register control means. Such machines are therefore feasible only when producing very large numbers of packs.

In addition, there is the danger that, in the operation of coating the web of paper between the above-described cooling and pressure rolls, the plastics material, which in most cases is polyethylene, may remain clinging to the roll at precisely the positions where the above-mentioned central portion has been removed from the cardboard or the hole has been formed, because the plastics material does not have any adhesion to the paper carrier at those positions. In fact, it is observed that many punched holes cannot be satisfactorily sealed in this manner.

In order to reduce the cost of the known machine, the attempt has already been made to form the holes in the paper web by an oscillating stamping punch, instead of using a pair of rolls. Although these known arrangements are less expensive to manufacture and simpler to operate, they do not permit the punch to penetrate accurately to a precise depth in the paper web.

Instead of subsequently coating the paper web after a hole has been made completely therethrough the attempt has been made to use the punch when the paper webs have already been coated on both sides. If for example the initial thickness of the paper is 0.4 mm, including the plastics coatings, then the thickness of the outwardly directed plastics coating is for example 0.01 mm while the plastics coating which forms the inwardly facing surface is 0.04 mm in thickness. The punching blade is intended to punch completely through the thin outer layer and the layer of paper which is arranged between the two layers of plastics material, whereas the inwardly disposed plastics coating is to remain undamaged so as not to impair the seal of the pack. In the above-indicated example, this means that the blade is to be pressed into the coated paper web to such a depth that the depth of punching is 0.35 mm.

However, this process suffers precisely from the disadvantage that it is not possible to achieve such a precise depth of punching. On the contrary, it is frequently observed that the punching blade is pressed into the coated paper web to a greater or lesser depth. If the punching is excessive in depth, then the seal afforded by the liquid pack is endangered. If the punching is not sufficiently deep, then considerable difficulty is encountered in pushing a hole through the paper web in the finished, filled pack, by means of the straw. In particular, the known apparatus is dependent on the sharpness of the punching blade. As soon as the blade becomes blunt, problems arise. It has been found that hitherto there is no possibility of adjusting the pressure with a sufficient degree of accuracy so that the paper web is in every case punched to the appropriate depth.

With an awareness of this difficulty, the attempt has also already been made to punch completely through the paper web which is coated on both sides, and subsequently reclose the paper web in the region of the hole, by means of a plastics film or foil. However, this involves excessive expenditure, and such machines are frequently liable to breakdown.

The problem of the present invention is therefore to provide an apparatus of the above-indicated kind, which permits the desired hole to be punched in the web to the desired depth, using simple means.

According to the invention, this problem is solved in that the punch has a rotatably driven cutter head.

The basic concept of the invention lies in moving the punch or the edge forming the blade at the tip of the punch, in such a way that it is not only pressed into the paper web, as in the previously conventional purely punching operation, but is also moved perpendicularly to that direction of movement, thereby producing a cutting effect as when using a knife. This step cuts the desired hole in the web, and it is advantageously even possible to produce larger-diameter holes in paper webs to a precise cutting depth and with the same depth of cutting or punching over the entire periphery of the hole. Even if, in harsh operation of the machine, one point on the edge of the blade projects out of the cutting head towards the tip more than another point, nonetheless the rotary movement of the cutting head about the longitudinal axis thereof, which is perpendicular to the strip of paper to be punched out, produces a cut of uniform depth, for the point on the blade which projects more is passed around the entire periphery of the hole, due to the rotary movement of the blade.

Due to the rotary movement of the cutter head, the pressure forces required for inserting the cutter head into the paper web to be punched can be considerably less. The result of that is in turn the possibility that the punching apparatus in accordance with the invention can be smaller and lighter in construction, so that it can be disposed in a particularly advantageous manner at appropriate positions in the packaging machine. For example, it is possible to make use of suitable carrier beams, preferably those at the embossing or stamping station, so that there is no need for additional control devices which give rise to susceptibility to trouble and which result in an increase in cost, in the known apparatuses.

It is also advantageous in accordance with the invention for the cutter head to be mounted in an outer carrier and to be adjustable in the axial direction and lockable relative to the outer carrier, by means of an adjusting nut. This arrangement makes it possible to produce a precise depth of cut and for the depth of cut to be varied as desired. The adjusting nut is therefore rigidly connected, for example by a screw means, to the cutter head, and bears by means of its end face against the outer carrier which carries the cutter head. This support function is performed by means of a friction clamping surface which is preferably disposed on the outer carrier and against which the adjusting nut can be firmly locked by suitable means, preferably clamping screw means.

It is also desirable in accordance with the invention for the cutter head to be releasably secured to a drive shaft. This gives the advantage that the cutter head carrying the blade can be replaced when worn, and the cutter head is held in the drive shaft by its securing means, for example a suitably secured screw means, so that the cutter head is driven by the drive shaft. The drive shaft in turn is connected to a motor which is rotated intermittently or continuously during the punching operation.

The possibility of adjustment in respect of the depth of cut, which is variable but nonetheless precise, is further enhanced by the hollow drive shaft which is preferably mounted by way of ball bearing assemblies in an adjustable mounting cylinder, being held without play in the direction of its axis. This can be achieved for example by means of a nut with a lock nut fitted thereover.

In another advantageous embodiment of the invention, the cutter head and the drive shaft are hollow, the hollow spaces are in alignment with each other, and the drive shaft is provided with at least one radial bore at its rearward end which is remote from the tip of the cutter head. If, contrary to expectation, the cut forming the above-mentioned central portion in the paper web results in the central portion being torn from the non-perforated plastics coating, then that piece of cardboard can move rearwardly through the hollow spaces in the cutter head, which are preferably in the form of bores, go back in the drive shaft, and be discharged to the exterior through the one or more radial bores.

So that this disengagement of the central portion does not take place in the region of the punched hole, the circular blade at the tip of the cutter head is preferably of such a configuration that a circular edge is formed, in accordance with the invention, which edge is defined by the line of intersection between the cylinder of the central bore forming the hollow space in the cutter head, and a cone which increases in size rearwardly from the tip. Therefore, one surface behind the circular edge of the blade is a cylindrical surface which surrounds the central bore, while the other surface behind the circular edge of the blade is a frustoconical surface, the truncated cone flaring outwardly in a rearward direction, that is to say, away from the web of paper, from the tip of the cutter head. This configuration in respect of the tip of the cutter head provides that the right surface portions are subjected to friction: more specifically, with a cutter head blade of this kind, the greatest amount of friction occurs at the above-described frusto-conical surface. The pressures which occur at that surface increase in proportion to an increasing radius of the frustoconical surface. On the other hand, with this blade in accordance with the invention, the lowest friction occurs in the region of the cylindrical surface, that is to say, at the periphery of the central bore. In this way, the round central portion in the web of paper can least be torn away from the adhesive means, preferably from the plastics material which is disposed thereover, due to penetration of the blade with the central bore. The round central portion therefore remains in the web of paper.

In a particularly advantageous aspect of the invention, a precise depth of cut can be achieved in that, in accordance with the invention, the outer carrier which carries the cutter head can be pressed against a resiliently mounted plate of large surface area. The above-mentioned counterplate against which the punch or cutter head is pressed therefore rests on at least one compression spring which can be compressed in the direction of the stroke movement of the punch (for producing the punchihg operation or the cutting operation) and thus in the direction of the longitudinal axis of the hollow drive shaft and the longitudinal axis of the cutter head.

In a particularly preferred embodiment of the invention, the punching apparatus is disposed on the carrier beam of an embossing or stamping station, and the resiliently mounted plate is disposed on the opposite part of the beams. In this way, two functions are effected simultaneously with one and the same stroke movement, namely embossing the line required in the paper web on the one hand, and punching holes on the other hand. If two functions are performed simultaneously by members which are movable relative to each other, this necessarily means that one function must be performed before the other. By virtue of the resilient mounting for the counterplate, the punching apparatus is capable of performing the punching operation before the embossing operation. At the same time, the invention advantageously provides that the distance between the sprung plate and the outer carrier, that is to say, those two surfaces which are disposed opposite each other in the punching apparatus and between which the paper web to be punched is passed and gripped, determines the depth of penetration of the blade into the paper web. The paper web is clamped fast between the outer carrier or the end contact surface thereof and the sprung plate (single-ply or double-ply, depending on the particular requirements concerned), as is permitted by the one or more springs.

Therefore, the area of the resiliently mounted plate is large in comparison with the hole to be punched in the paper, because that compensates for fluctuations in the thickness of the paper.

A scale may also be advantageously disposed on the adjusting nut, for co-operation with a pointer disposed on the outer carrier for the cutter head and the drive shaft. That arrangement provides a simple indication in respect of the depth of cut, because the scale can be calibrated in terms of the depth of cut.

Figure 2:
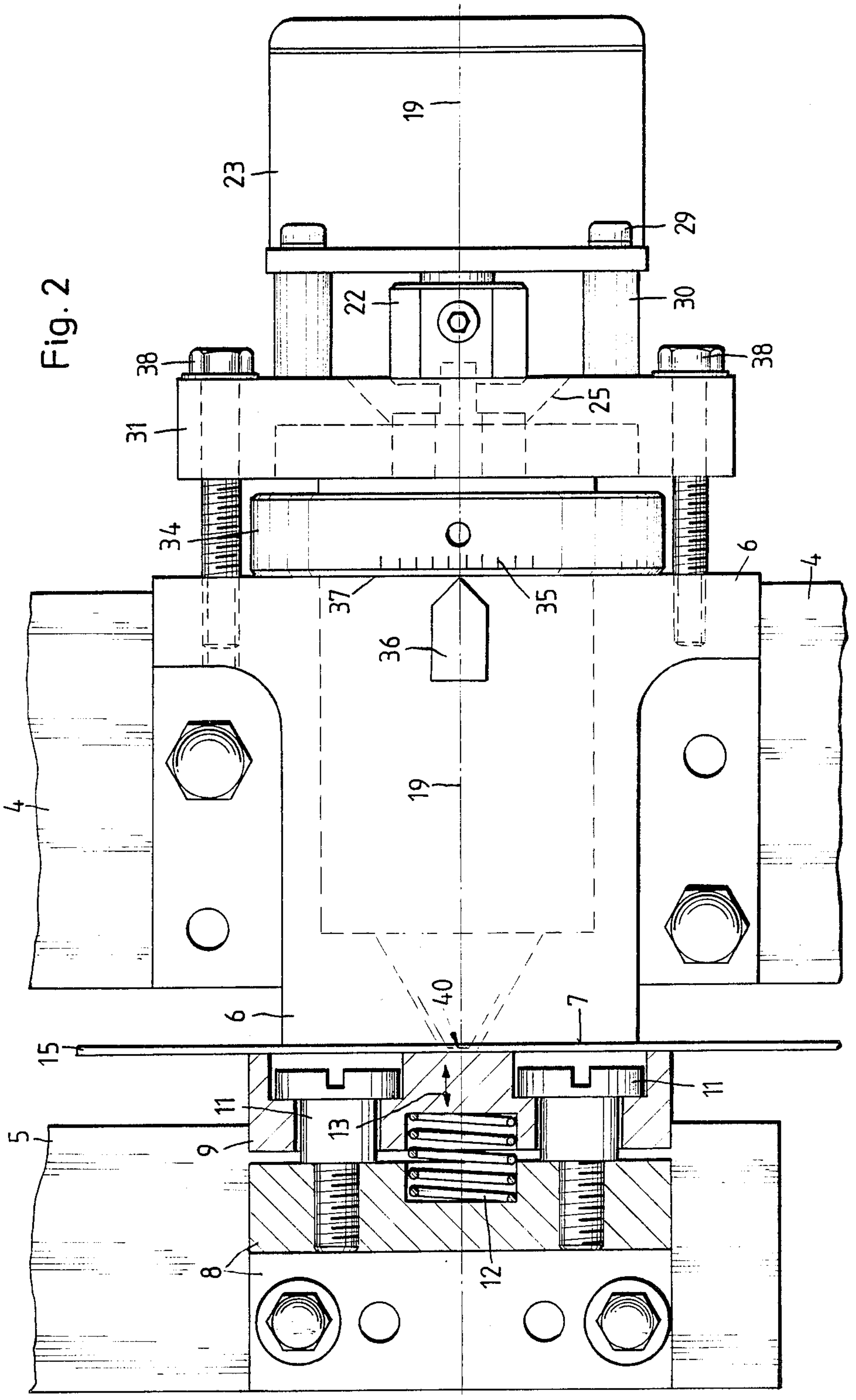
Figure 3:
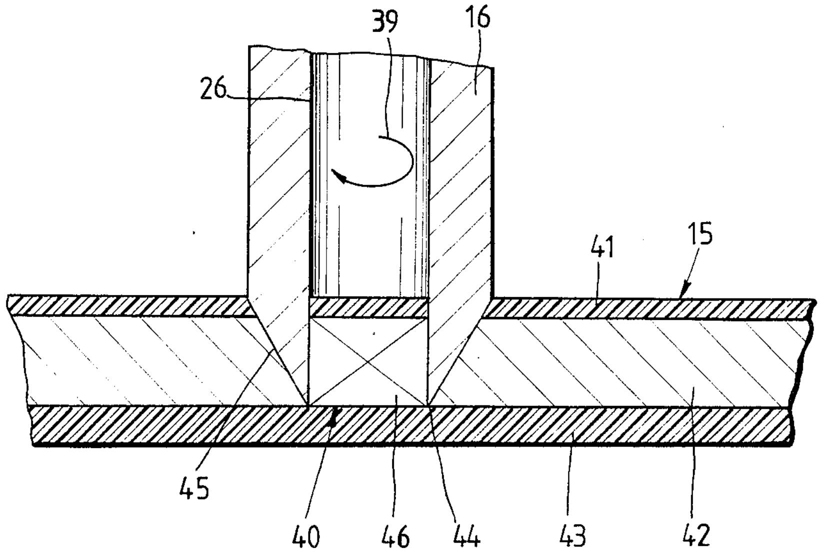

Further advantages, features and possible uses of the present invention will be apparent from the following description of a preferred embodiment, with reference to the drawings in which:

FIG. 1 shows a side view in cross-section of a punching apparatus according to the invention, FIG. 2 shows a plan view of the punching apparatus of FIG. 1, and FIG. 3 shows a broken away diagrammatic view on an enlarged scale of the circular blade at the tip of the cutter head at the desired depth of penetration into the paper web.

Referring to FIGS. 1 and 2, shown therein is a punching apparatus which is arranged in the region of the embossing station shown in FIG. 1 and indicated generally by reference numeral 1, with the two embossing plates 2 and 3. The punching apparatus has a carrier beam 4 at the stamping punch side (on the right in FIGS. 1 and 2), and a carrier beam 5 on the counterplate side (on the left in FIGS. 1 and 2). The outer carrier 6 with its end contact surface 7 is fixed on the carrier beam 4, while the carrier block 8 for the resiliently mounted plate 9 is disposed on the opposite carrier beam 5. As already mentioned, the plates 3 and 2 are also secured to the beams 4 and 5. The plates 3 and 2 are provided with embossing means (bead and channel) at the positions indicated by reference numeral 10.

The resiliently mounted counter-plate 9 is guided by way of two screw members 11, and supported against the compression spring 12. That arrangement permits the plate 9 to move in the direction of the double-headed arrow shown at 13 in FIG. 2, although the carrier beam 4 or 5 or both also have the capability of movement in the direction of the double-headed arrow 14 shown in FIG. 1. It will be seen that the resiliently mounted plate has a large surface area at least in one direction (perpendicular to the plane of the paper in FIG. 1 and downwardly in the plane of the paper in FIG. 2), in particular in comparison with the hole to be punched in the paper web 15.

Secured to the carrier beam 4 is the outer carrier 6 which is open rearwardly at one end and which forms the contact surface 7 at its front end. In its center, the outer carrier 6 is provided with a further opening through which the cutter head 16 can project in front of the contact face 7. An adjustable mounting cylinder 18 is arranged displaceably in the direction of the longitudinal axis 19 of the general arrangement, in the cylindrical hollow space 17 in the outer carrier 6. The adjustable cylinder 18 is also hollow in its interior and carries the ball bearing assemblies 20 which are arranged at a spacing from each other in the axial direction 19, for the concentrically disposed and supported, hollow drive shaft 21. The cutter head 16 is screwed into the front end of the drive shaft 21, while the rearward end thereof is secured by way of the coupling means 22 to the drive shaft of the motor 23. Also disposed at the rearward end of the drive shaft are two radial bores 24 which communicate freely with the outside air by way of the frustoconical surface 25.

It will be seen in particular from FIG. 1 that the two cylindrical hollow spaces 26 and 27 which are disposed coaxially in the cutter head 16 and which are aligned with each other are also aligned with the cylindrical hollow space 28 and therefore communicate therewith. The hollow space 28 is in the form of a central bore extending along the axial direction 19 of the arrangement, in the drive shaft 21. In addition, the radial bores 24 communicate with the cylindrical space 28 so that pieces of paper which are punched out of the paper web 15 in operation of the machine and which contrary to expectation are nevertheless torn out now and then can reach the exterior by following the above-described path formed by the intercommunicating hollow spaces.

The motor 23 is secured to an elongate motor support plate 31 by way of screw members 29 and sleeves 30.

The motor support plate 31 is fixedly mounted to the adjustable mounting cylinder 18 so that, upon displacement along the axis 19 in a forward direction (towards the left in FIGS. 1 and 2) or in a rearward direction (towards the right in FIGS. 1 and 2), the motor 23 with sleeves 30, motor support plate 31, mounting cylinder 18, drive shaft 21 and cutter head 16 are moved. So that such movement in the direction of the axis 19 can be performed satisfactorily and accurately, the adjustable mounting cylinder 18 is clamped absolutely without play, so as to be unable to move in the direction of the axis 19, by way of the ball bearing assemblies 20, a spacer disc 32 and two nuts 33 disposed one behind the other. Adjustment itself is effected by means of the adjusting nut 34 which carries a scale 35, as shown in FIG. 2, co-operable with a pointer 36 on the outer carrier 6. Rotation of the adjusting nut 34 causes the above-described unit comprising the motor 23, the adjustable mounting cylinder 18, the drive shaft 21 and the cutter head 16 to be moved in the axial direction 19 either forwardly or rearwardly (towards the left or towards the right in the drawings). The adjusting nut 34 acts on the outer carrier 6 by way of the friction clamping surface 37 and is also clamped fast by the locking screw means 38. In this manner, the tip 40 of the cutter head 16 can be adjusted to project beyond the contact surface 7 of the outer carrier 6 by the required distance.

FIG. 3 shows a diagrammatic broken-away view of the tip 40 of the cutter head 16 which rotates for example in the direction indicated by the arrow 39 and is pressed with a cutting action into the paper web 15 comprising the outer plastics coating 41, the paper carrier material 42 and the inner plastics coating 43. The circular blade at the tip 40 is formed by the circular edge 44 which is defined by a line of intersection produced by the cylinder of the central bore which forms the front hollow space 26 in the cutter head 16 intersecting a cone which flares rearwardly (upwardly in FIG. 3) from the tip 40, thereby defining the frustoconical surface 5.

The highest pressure is applied to the paper web 15 in the regions in front of the frustoconical surface 45, at the top, at the outer plastics layer 41. That pressure slowly decreases towards the tip 40. The central portion 46 is cut out of the paper web 15 in the cylindrical hollow space 26 by the edge 44 of the blade, with the central portion 46 being of an approximately cylindrical shape. Friction between the cylindrical surface of the central portion and the cylindrical hollow space 26 or the surface thereof tends towards zero and is comparatively less than at the frustoconical surface 45.

In operation, the carrier beams 4 and 5 move apart, and the paper web 15 is conveyed in a downward direction and is inserted between the embossing punches 2 and 3, and the contact surface 7 and the oppositely disposed surface of the resiliently mounted plate 9. If now the carrier beams 4 and 5 are moved towards each other, the paper web 15 which is inserted in single-ply or double-ply configuration, being displaced by the surface 7 of the outer carrier 6, first comes into abutment against the surface of the resiliently mounted plate 9, which is disposed opposite the contact surface 7. The plate 9 is deflected towards the left in FIGS. 1 and 2 with the spring 12 being compressed. The motor 23 sets the drive shaft 21 with the cutter head 16 in rotation as indicated by the arrow 39 in FIG. 3, and in so doing produces the cut in the paper web, to the desired depth, as shown in FIG. 3. It will be seen from FIG. 3 that the inwardly disposed plastics coating 43 remains intact so that the seal afforded by the composite material is not endangered. The adhesion between the central portion 46 and the plastics coating 43 is sufficient, or is less than the friction with respect to the cutter head 16, so that the cylindrical central portion 46 remains clinging in position, even when the cutter head 16 is retracted again.

After the punching-cutting operation, the cutter head 16 is moved out of the position shown in FIG. 3, by the carrier beams 4 and 5 being moved apart again.

The tip 40 of the cutter head 16 projects in front of the contact surface 7 of the outer carrier 6 by precisely the distance corresponding to the depth of cut which is to be made in the above-described mode of operation, that is to say, for example by a distance of 0.35 mm, when dealing with the example referred to hereinbefore. The depth of cut is determined by the distance between the sprung plate 9 and the outer carrier 6 or the front contact surface 7 thereof. The edge 44 of the blade can penetrate into the paper web 15, by that distance.

We claim:

1. Apparatus for making a circular cut of predetermined depth in a paper web, said apparatus comprising:

a rotatably-driven circular cutting head;

means for supporting said paper web comprising a resiliently-mounted counterplate positioned to face said cutting head perpendicular to the axis thereof, said counterplate having a surface area, facing said cutting head, which is substantially larger than the circular cutting area defined by said cuttting head;

means for moving said cutting head from a first position in which it is spaced from said paper web to a second position in which it engages said paper web and makes circular cut therein; and means including a reciprocably movable outer carrier for adjusting the axial position of said cutting head relative to said outer carrier and for securing said cutting head in a fixed axial position relative to said outer carrier to thereby limit the depth of said circular cut to a preselected depth which is less than the thickness of said paper web.

2. Apparatus, as recited in claim 1, wherein said means for adjustably securing said cutting head includes an adjustable nut which bears against said outer carrier, the rotation of said adjustable nut coupled to said cutting head to cause said cutting head to be axially repositioned relative to said outer carrier.

3. Apparatus, as recited in claim 2, wherein said means for adjustably securing said cutting head further includes a mounting cylinder, adjustably secured in the direction of the axis of said cutting head within said outer carrier, said cutting head coupled to said mounting cylinder, said adjustable nut threadably engaged with the outer surface of said mounting cylinder and bearing against said outer carrier, rotation of said adjustable nut axially repositioning said mounting cylinder with respect to said outer carrier, whereby said cutting head is axially repositioned.

4. Apparatus, as recited in claim 3, wherein the end of said outer carrier proximate to said counterplate includes a flat contact face, dimensionally at least as large as the surface of said counterplate, an opening provided in said contact face, whereby the axial repositioning of said mounting cylinder toward said contact face causes the tip of said cutting head to project through said opening toward said counterplate.

5. Apparatus, as recited in claim 1, wherein said cutting head is mounted within said reciprocably movable outer carrier and is secured to a drive shaft, said cutting head rotatably supported within said outer carrier through the drive shaft and a mounting cylinder, said drive shaft passing through said mounting cylinder, the mounting cylinder being axially movable against said outer carrier, the axial movement of the mounting cylinder against the outer carrier being limited by an adjusting nut coupled to the mounting cylinder.

6. Apparatus, in accordance with claim 5, wherein said drive shaft is supported within said mounting cylinder on a plurality of ball bearings.

7. Apparatus, in accordance with claim 5, wherein said adjusting nut engages a plurality of corresponding threads in the periphery of said mounting cylinder, said adjusting nut further bearing against said outer carrier.

8. Apparatus for making a circular cut of predetermined depth in a paper web, said apparatus comprising:

a reciprocably movable outer carrier;

a mounting cylinder axially movable against said outer carrier;

a nut coupled to said mounting cylinder for limiting axial movement of said mounting cylinder against said outer carrier;

a drive shaft passing through said mounting cylinder;

a rotatably-driven circular cutting head mounted within said outer carrier and secured to said drive shaft, said cutting head rotatably supported within said outer carrier through said drive shaft and said mounting cylinder;

means for supporting said paper web comprising a resiliently-mounted counterplate positioned to face said cutting head perpendicular to the axis thereof, said counterplate having a surface area, facing said cutting head, which is substantially larger than the circular cutting area defined by said cutting head;

means for moving said cutting head from a first position in which it is spaced from said paper web to a second position in which it engages said paper web and makes a circular cut therein; and means for adjusting the axial position of said cutting head relative to said outer carrier to thereby limit the depth of said circular cut to a preselected depth which is less than the thickness of said paper web.

9. Apparatus, in accordance with claim 8, wherein said drive shaft is supported within said mounting cylinder on a plurality of ball bearings.

10. Apparatus, in accordance with claim 9, wherein said adjusting nut engages a plurality of corresponding threads in the periphery of said mounting cylinder, said adjusting nut further bearing against said outer carrier.

11. Apparatus as recited in claim 1, wherein said outer carrier is mounted on a first carrier beam, said counterplate is mounted on a second carrier beam, said first and second carrier beams also having respectively secured thereto first and second embossing plates.

* * * * *